July 19, 1932.  L. C. STUKENBORG  1,867,602

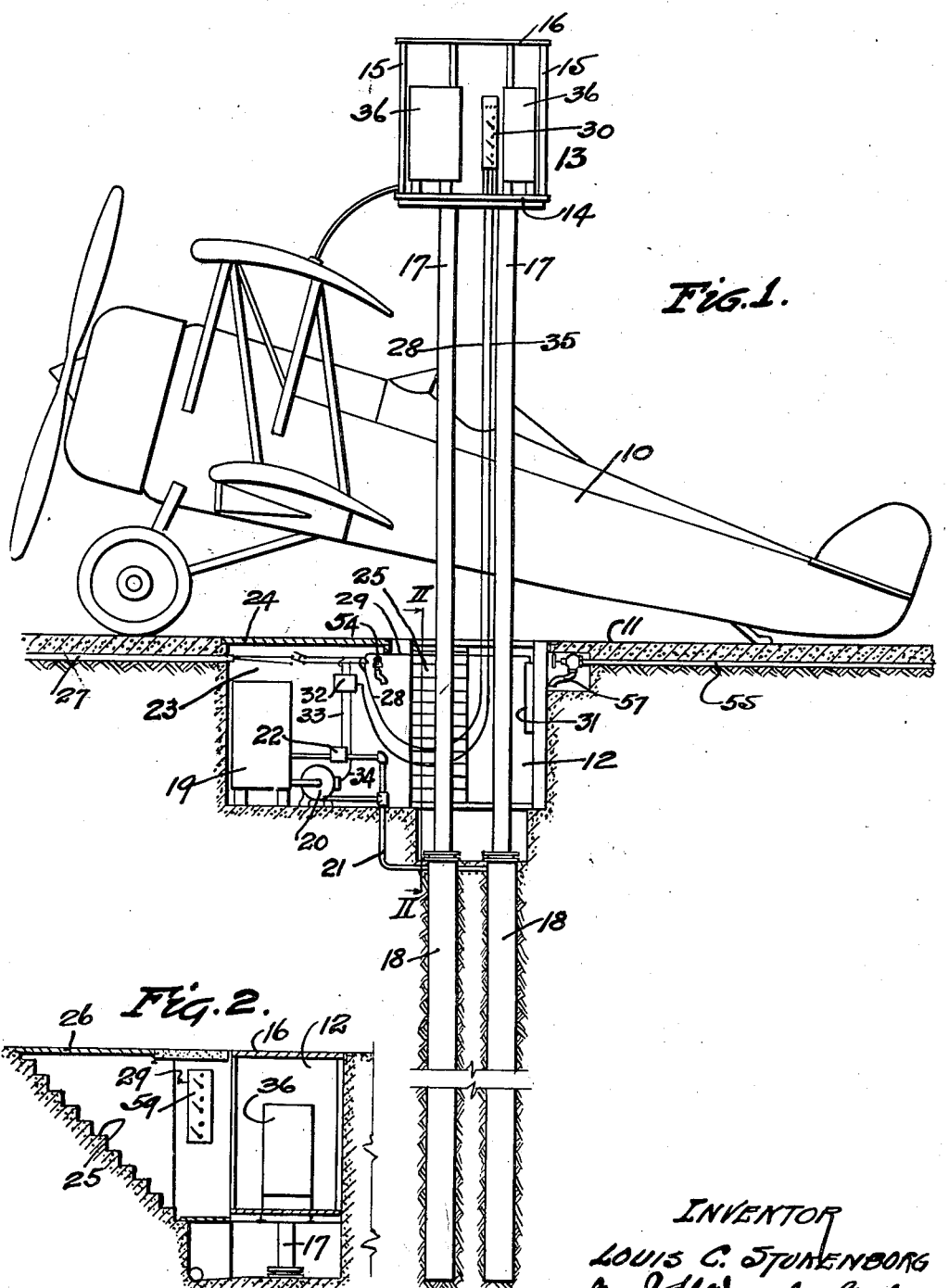

FUELING SYSTEM

Filed Dec. 1, 1930   3 Sheets-Sheet 2

INVENTOR
LOUIS C. STUKENBORG.
by J. W. Weatherford
ATTORNEY.

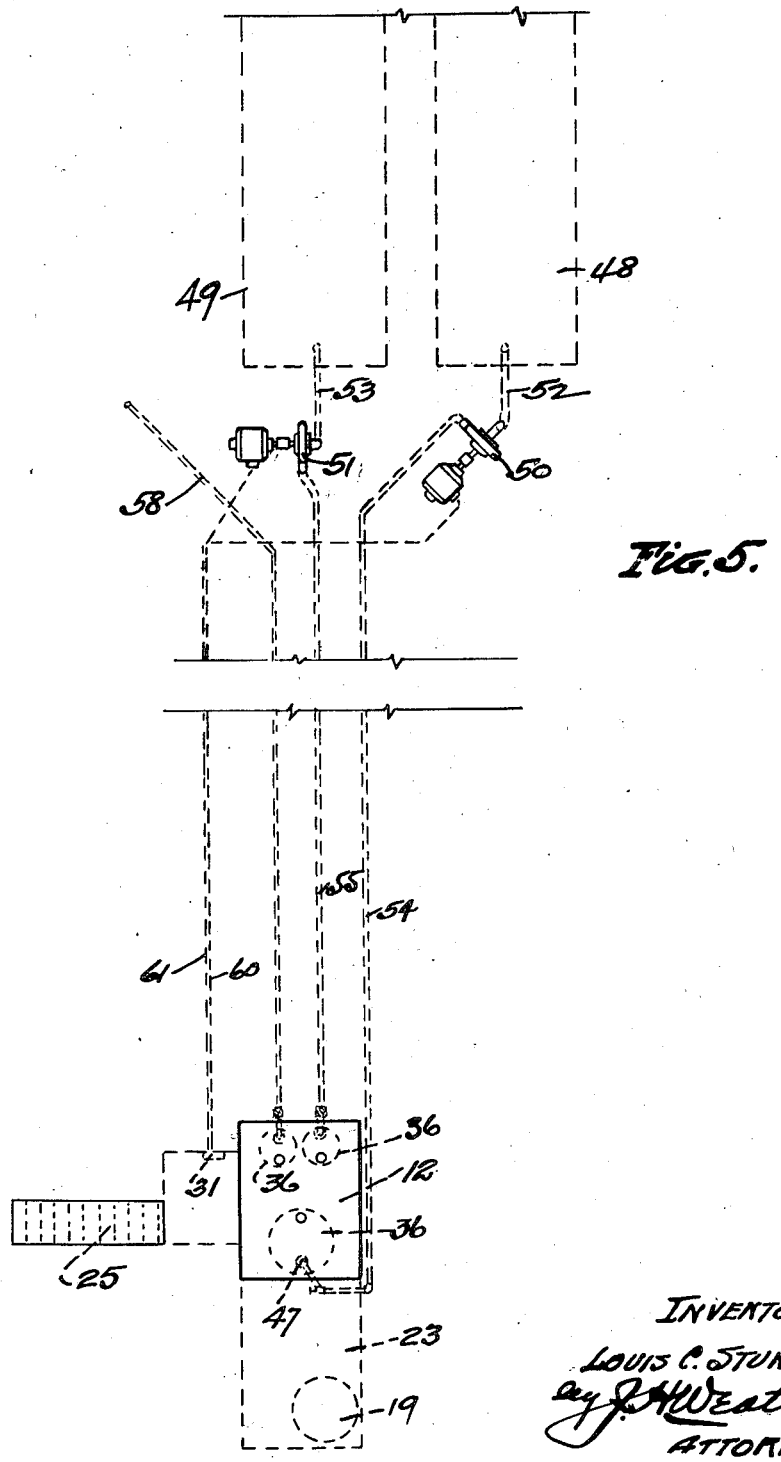

Patented July 19, 1932

1,867,602

UNITED STATES PATENT OFFICE

LOUIS C. STUKENBORG, OF MEMPHIS, TENNESSEE

FUELING SYSTEM

Application filed December 1, 1930. Serial No. 499,178.

This invention relates to improvements in means and methods for fueling and servicing airplanes.

In fueling and servicing airplanes comparatively large quantities of fuel oil, lubricating oil and in some cases of water are required; there must be no obstruction of the landing and/or take off field by supply tanks or other structures; the filling openings of the plane tanks are at considerable heights above the ground and in the larger planes are almost inaccessible from the ground and speed in the filling or replenishing of these tanks is usually an essential.

In addition to this the landing and/or take-off runways are necessarily located in open spaces at considerable distances from a base of supply, and are often to a large extent isolated when the flying field is saturated during a rainy season so that the question of getting these supplies in adequate quantities to the plane often becomes a serious problem.

The objects of the present invention are:

(a) To provide a storage and filling system which will maintain the field uninterrupted during landing or take-off; which will establish a service supply in or adjacent to the run-ways and which will permit positioning of the plane tanks adjacent the service tanks for filling the plane tanks.

(b) To provide means for replenishing the supply in the service tanks; and (c) To provide means for raising the service tanks above the level of the plane tanks whereby the latter may be filled by gravity and/or to provide means for mechanically accomplishing flow from the service tanks to the plane tanks, to speed up service.

These objects are accomplished by positioning the service tanks below the ground level, with a roof over them which serves to maintain the field surface uninterrupted; by raising these tanks and supporting them at desired level with relation to a plane which has landed and been positioned for servicing; by controlling all operations preferably from the level of the tanks in any positions they may occupy; and by replenishing the supply in the service tanks from remote storage tanks, by controls operated at or adjacent the service tanks.

The means by which these and other objects are accomplished, and the manner of their accomplishment will readily be understood from the following specification on reference to the accompanying drawings, in which:

Fig. 1 is a sectional side elevation showing the tanks raised above the level of a plane positioned adjacent thereto for the purpose of being serviced.

Fig. 2 is a fragmentary sectional elevation taken as on the line II—II of Fig. 1, with the tanks lowered below the ground level.

Fig. 5 is a ground plan showing a typical field layout for the service tanks and remote storage tanks.

Figure 4:
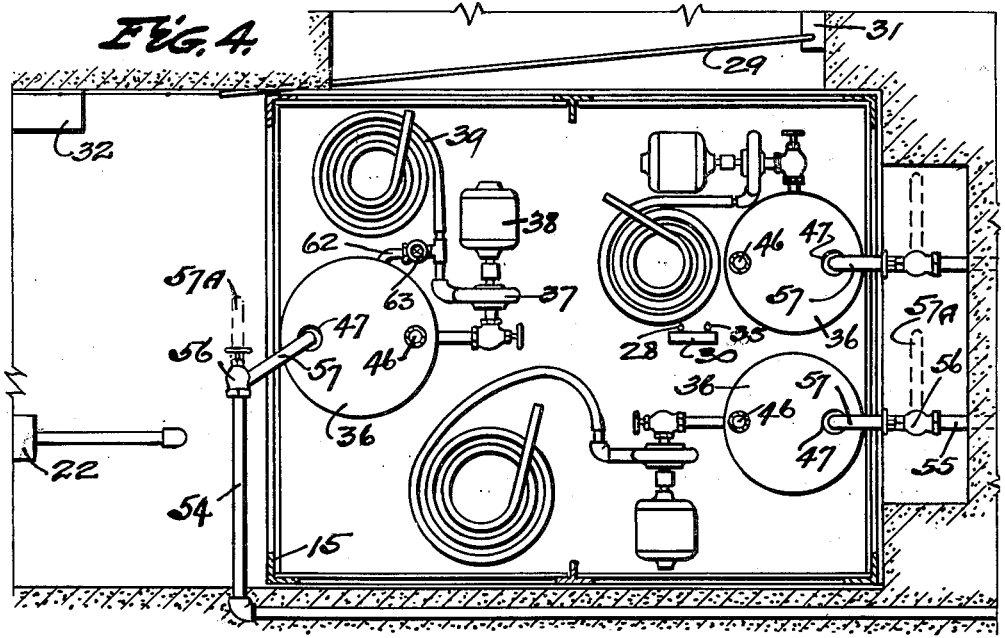
Fig. 4 is a sectional plan taken as on the line IV—IV of Fig. 3.
Figure 3:
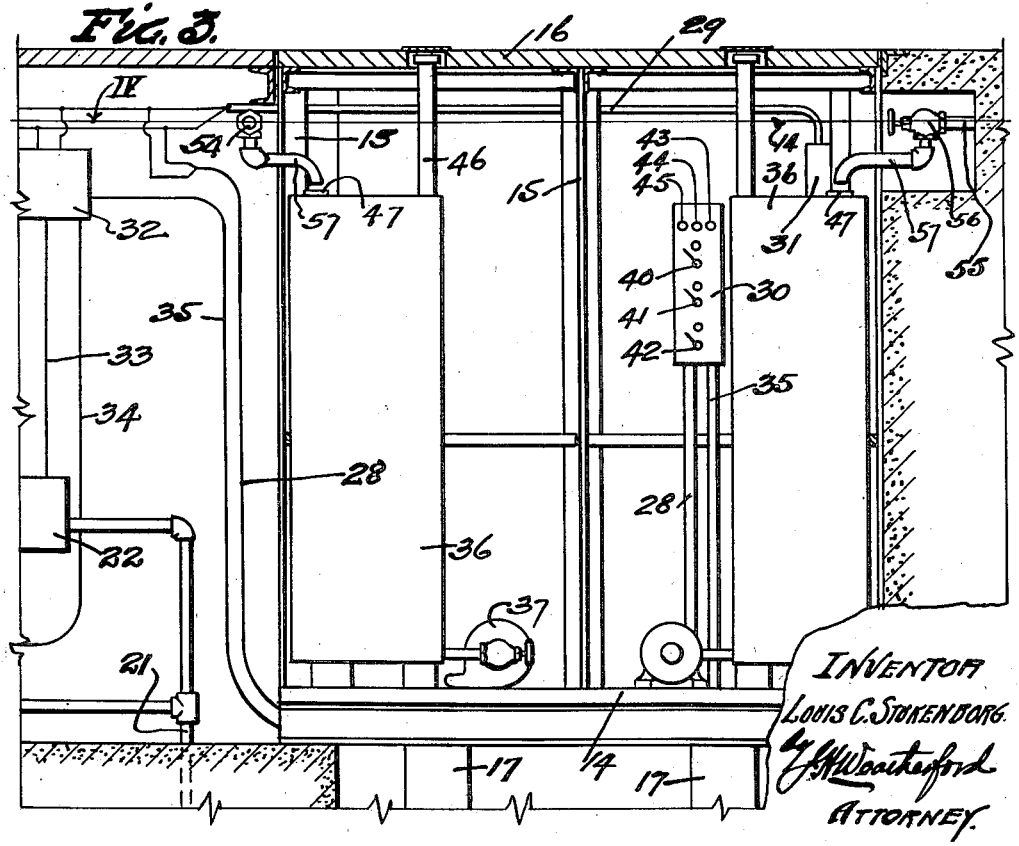
Fig. 3 is an enlarged fragmentary sectional elevation looking in the direction of Fig. 1, showing the tanks lowered below the ground level.

Referring now to the drawings in which the various parts are indicated by numerals, 10 is an airplane the tanks of which are to be filled, 11 is the surface of the flying field, 12 is a pit hereinafter designated as an elevator pit which is adapted to receive the cage 13 of an elevator. This cage comprises a floor 14 from which uprights 15 extend. These uprights support a roof 16 which roof when the elevator is lowered into the pit forms a cover for the pit which is flush with the surface of the ground. Preferably the elevator cage is raised by two or more plungers 17 which dual plungers guide and support the cage in its upward movement and prevents rotation thereof. Each of the plungers is slidably disposed in a vertical cylinder 18 and is forced therefrom by hydraulic pressure.

19 is a fluid reservoir, 20 an electrically operated pump connected thereto, and 21 a pipe leading from the pump to both the cylinders. 22 is an electrically operated return valve for permitting return flow from the cylinders to the reservoir. The detail of this actuating system for the elevators is not a part of the present invention, but a typical illustration of the same is shown in my pending application for patent on hydraulic elevators, Serial No. 495,069, filed Nov. 12, 1930.

The fluid reservoir 19 with the pump, motor and accessories is housed in a pit or chamber 23 which is adjacent to the elevator pit 12 and connected therewith. 24 is a roof or cover for this pit which roof is either flush with the surface of the ground or if desired, entirely covered over so as to form in either event an undisturbed part of the runway. 25 are steps leading into the elevator pit, access to these steps being had by means of a trap door 26 which door when closed is likewise flush with the surface of the field. 27 is a conduit entirely under ground which brings in the power circuit wires, which are connected directly through cables 28 and 29 with switch boards 30 and 31 respectively in the elevator cage and pit, and also to a control box 32 which houses the elevator motor switches. From this box a circuit cable 33 leads to the electrically controlled valve 22, and a second circuit cable 34 to the motor operated pump 20. 35 is a circuit control cable leading from the switch board 30 in the elevator cage to the control box 32.

Mounted on the floor of the elevator cage are service tanks 36 for fuel, lubricating oil and water. Preferably each tank is provided with a pump 37 driven by a motor 38 and with a discharge pipe 39 by which its content may be pumped to the airplane. Current for these motors is supplied through the cable 28 and is distributed from the switch board 30 as by the switches 40, 41, and 42, each switch controlling one of the pump motors. The wiring being well known need not here be illustrated. Also mounted on the switch board are three buttons 43, 44 and 45 from which buttons the cable 35 carrying the control wires for the elevator circuit run to the control box 32. These buttons as is usual in elevator practice control the up and down movement of the elevator and the stopping thereof and their detail is not a part of the present invention.

Each of the tanks is provided with a pipe 46 which extends upward therefrom and through which it may be filled, these pipes extending to the surface of the roof 16 and being provided with suitable covers so that if necessary a tank wagon may be driven thereover and the tanks filled from such wagon. Preferably also each of the tanks is provided with an additional filling opening 47 and suitable reservoirs 48 and 49 are provided at a remote and accessible portion of the field for the storage of the main fuel and oil supply. These tanks are provided with motor driven pumps 50 and 51 which pumps take their supply through the pipes 52, 53 from the tank and discharge through underground pipes 54, 55 to the fuel and oil tanks respectively. Each of these pipes is provided with a cut-off valve 56 which may be operated from the elevator pit, and with a swinging nozzle 57 which may be swung to the dotted position 57A, shown out of the path of the elevator. An additional pipe line 58 ordinarily connected directly to an elevated water tank or other source of water supply similarly leads to the water tank on the elevator and is similarly controlled.

From the switch board 31 in the elevator pit independent power circuits 60, 61 (indicated each by a single dotted line) lead to the motors of the pumps 50 and 51. These circuits are controlled from the switch board 31 so that operation of the pumps is effectuated from the elevator pit.

Each of the service tanks 36 may be provided with an additional outlet pipe 62 controlled by a valve 63 and which is connected to the discharge pipe 39 so that gravity flow from the tank may be used instead of discharging the content by pumping, only one such connection, however is shown.

The elevator pit 13 and the associated pits and chambers are preferably permanent installations, lined with concrete as indicated, or with any other desired material.

In installing a system of this kind the elevator pit and associated chambers are constructed adjacent, or if it be desired within the limits of, the runways and the elevator cylinders are set in proper position in the elevator pit care being taken to set the cylinders absolutely parallel and in a true vertical position. The floor of the elevator cage is then installed on the top of the pistons and the roof of the cage so supported that when the cage is fully lowered the top of the roof will be exactly flush with the surface of the runway and will complete an uninterrupted surface therefor.

The storage tanks are placed at a remote point where they may be easily reached for filling, as from railroad tank cars or tank trucks, and underground connections are established from these storage tanks to the elevator pit. Underground electric circuits are carried to the elevator pit and control switches and panels established therein.

The service tanks for fuel oil, lubricating oil, water and, if desired, other service tanks are mounted on the floor of the elevator cage. Preferably the height of the cage is such that the operator may stand upright on the floor and still be clear of the roof. In establishing the size of the cage, consideration is given particularly to the number and size of tanks, that the amount of fuel oil and other oils or liquids require for servicing one plane, space is also provided to take care of the discharge pipe from these tanks and for pumps and other accessories.

It will be noted that the current wires for such electrical machinery as is mounted on the floor of the cage, are carried through a flexible cable so that connection is maintained at all elevations of the elevator cage, and similarly that the elevator control wires are carried in a similar flexible cable from the control panel on the elevator to the switches of the elevator motor.

It will further be noted that the means for raising the tanks, the guides for such raising movement and the supports in raised position, are housed below the ground level when the tanks are lowered.

In using the device, the elevator cage is lowered into the pit, with the roof establishing a continuation of the flying field runway or other surface of the field and is there kept except during fueling operations. The plane to be fueled is brought as close along side the elevator pit as is possible without interfering with raising the cage. The attendant enters the elevator pit by means of the trap door and steps, and takes his position in the elevator cage. In such position he operates the elevator control buttons, raising the elevator cage preferably until the floor of the elevator is above the highest tank opening on the plane, he being in proper position to determine the height to which the cage shall be raised. The tank discharge pipes may then be placed, ordinarily one at a time, in the filling openings of the plane tanks and these tanks be filled either by gravity discharge or if desired, by direct pumping. If pumping be resorted to it will be noted that the pump control switches are in the elevator cage and are therefore convenient and accessible to the attendant.

When the plane has been fueled and supplied with the desired quota of lubricating oil and water the elevator attendant lowers the cage thus restoring the surface of the flying field to its former uninterrupted condition and, until such time as the elevator is against raised, maintaining such uninterrupted field surface for use of the plane.

After the elevator cage has been lowered the attendant may swing the various filling pipes over the respective tank filling openings, open the necessary valves, and through the switches in the elevator pit operate the necessary motors and pumps to replenish the service tank supplies.

It will of course be understood that current being available the elevator pit may be lighted in suitable or desired manner.

It will further be understood that the detail of the various mechanisms such as pumps, motors, control switches, etc., do not enter into the present invention and that these items are introduced for the purpose of suggesting mechanism by which the particular results may be accomplished. Also no attempt has been made to other than indicate main electric circuits and to a large extent that showing of wiring has been dispensed with.

Having described my invention, what I claim is:—

1. A fueling system comprising a runway, a pit below the surface of said runway, a tank disposed in said pit, means for raising and lowering said tank, means for covering said pit when said tank is lowered therein to complete said runway, and means for filling said tank in lowered position.

2. A fueling system comprising a runway, a pit below the surface of said runway, an elevator cage normally housed in said pit, tanks disposed in said cage, means for raising and lowering said cage, means carried by said cage for controlling movement thereof, and means for covering said pit when said tanks are lowered therein, to complete said runway.

3. A fueling system for a flying field, including a pit, an elevator cage normally housed in said pit, a hydraulic cylinder vertically disposed below said pit, a plunger mounted in said cylinder and carrying said cage, means disposed in said pit for actuating said plunger, a plurality of tanks in said cage, and means effective when said cage is lowered into said pit for establishing an uninterrupted field surface thereover.

4. A fueling system for a flying field, including a pit, an elevator cage normally housed in said pit, vertical hydraulic cylinders disposed below said pit, plungers mounted in said cylinders and carrying said cage, means disposed in said pit for actuating said plungers, a plurality of tanks, in said cage, and means effective when said cage is lowered into said pit for establishing an uninterrupted field surface thereover.

5. A fueling system, adjacent a runway, a pit below the surface of said runway, an elevator cage normally housed in said pit, tanks disposed in said cage and means for raising and lowering said cage, said cage having a roof adapted to form a cover for said pit, and complete the runway surface when said cage is lowered into said pit.

6. A fueling system for a flying field, including a pit in said field, a plurality of service tanks, normally disposed in said pit, means for raising said tanks from and lowering said tanks into said pit, means effective when said tanks are lowered into said pit for establishing an uninterrupted field surface thereover, a plurality of storage tanks remote from said pit and accessible for filling, sub surface pipes leading each from a storage tank to a service tank and means within said pit for controlling flow from said storage tanks to said service tanks.

7. In a fueling system, a tank and a support therefor normally disposed entirely below the ground surface, a cover therefor flush with said surface, and means normally disposed entirely below the ground surface for displacing said cover, raising said tank to, and supporting same above the ground in service position, and subsequently re-lowering said tank and reinstating said cover.

8. In a fueling system, a tank and an elevator supporting said tank, both normally disposed entirely below the ground surface, a cover for said tank and elevator flush with said surface, and actuating means for said elevator disposed entirely below the ground surface, said elevator being adapted to displace said cover, raise said tank to, and support same in service position, and subsequently to relower said tank and reinstate said cover.

9. A disappearing fueling system comprising a cage and a fuel supply tank carried thereby and normally embedded in a pit formed in the ground, and means controllable within said cage for raising said fuel supply tank to accessible servicing position above the surface of the ground for dispensing fuel therefrom.

In testimony whereof I hereunto affix my signature.

LOUIS C. STUKENBORG.